United States Patent
Xue et al.

(10) Patent No.: US 7,869,343 B1
(45) Date of Patent: Jan. 11, 2011

(54) FIELD PROGRAMMABLE GATE ARRAY ARCHITECTURES AND METHODS FOR SUPPORTING FORWARD ERROR CORRECTION

(75) Inventors: Ning Xue, Fremont, CA (US); Chong H. Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 1255 days.

(21) Appl. No.: 11/447,745

(22) Filed: Jun. 5, 2006

(51) Int. Cl.
  *G06F 11/00* (2006.01)
(52) U.S. Cl. .................. 370/216; 370/235; 370/538; 714/2
(58) Field of Classification Search .............. 370/216, 370/229, 542–545, 428, 537, 252, 538; 714/2
  See application file for complete search history.

(56) References Cited

U.S. PATENT DOCUMENTS 4,486,739 A * 12/1984 Franaszek et al. ............. 341/59
6,298,387 B1 * 10/2001 Prasad et al. ................. 709/236
6,775,799 B1 * 8/2004 Giorgetta et al. ............. 714/751
6,778,799 B2 * 8/2004 Shin et al. .................... 399/237
7,039,067 B2 * 5/2006 Feinberg et al. ............. 370/468
7,372,862 B2 * 5/2008 Wego et al. .................. 370/412
2003/0067655 A1 * 4/2003 Pedersen et al. ............. 359/152
2004/0202205 A1 * 10/2004 Sheth et al. .................. 370/539
2005/0163168 A1 * 7/2005 Sheth et al. .................. 370/537
2006/0256846 A1 * 11/2006 Oksman et al. .............. 375/222
2007/0247936 A1 * 10/2007 Direnzo et al. .............. 365/200
2008/0010582 A1 * 1/2008 Nieto et al. .................. 714/790

* cited by examiner

*Primary Examiner*—William Trost, IV
*Assistant Examiner*—Roberta A Shand
(74) *Attorney, Agent, or Firm*—Ropes & Gray LLP; Robert R. Jackson

(57) ABSTRACT

A field-programmable gate array ("FPGA") or programmable logic device ("PLD") includes relatively general-purpose PLD core circuitry and relatively specialized high-speed serial interface ("HSSI") hard IP circuitry. To better support applications that include forward error correction ("FEC"), some tasks related to FEC (e.g., FIFO operations) are performed in the PLD core circuitry, while other FEC tasks (e.g., FEC calculations) are performed in the HSSI hard IP circuitry.

28 Claims, 2 Drawing Sheets

FIELD PROGRAMMABLE GATE ARRAY ARCHITECTURES AND METHODS FOR SUPPORTING FORWARD ERROR CORRECTION

BACKGROUND OF THE INVENTION

This invention relates to field programmable gate array ("FPGA") integrated circuits and the like. More particularly, the invention relates to FPGAs that are better adapted for use in applications involving the types of data processing techniques that are sometimes referred to as forward error correction. Another term that is sometimes used for at least some FPGAs is programmable logic device or PLD. The terms FPGA and PLD are used interchangeably herein.

FPGAs are typically designed to be relatively general-purpose devices. An FPGA is designed so that it can support any of many different possible uses. Each user of the FPGA can then program or configure the device to perform the particular task or tasks which that user needs to have the FPGA perform. The FPGA can be manufactured in larger quantities at lower unit cost because it can be sold for many different uses.

An area of increasing interest for use of FPGAs is in high-speed serial data communication. The speeds of interest for such communication are constantly increasing. Also, the number of different protocols that may be used for such communication is similarly increasing. Some of these protocols involve the technology known as forward error correction or FEC. FEC may involve sending each block of real user data with some additional bits of information that are computed from the user data. At the receiver, these additional bits can be used to determine whether there are any errors in the user data as received, and also to correct such errors (provided the number of errors does not exceed the limit of the error-correction capability of the FEC technique being employed).

As data rates become very high, it becomes increasingly difficult to perform FEC in the general-purpose core logic of an FPGA. For example, at very high data rates such as 10 Gbps (gigabits per second), 12.8 Gbps, or higher, very wide data buses may be necessary to permit FEC in FPGA core logic. This may have a number of disadvantages such as using up large amounts of core logic resources and necessitating long signal paths that can force operation of the FPGA at a lower speed. The present invention allows FPGAs to support FEC in a different way.

SUMMARY OF THE INVENTION

The invention has high-speed serial data transmitter aspects and high-speed serial data receiver aspects.

On the transmitter side, relatively general-purpose, programmable, core circuitry of a PLD may be used to assemble blocks of user data at a clock rate that is appropriate for such data without associated FEC information. The PLD core circuitry outputs blocks that include the user data but at a different clock rate that is appropriate for data with associated FEC information. The blocks that are thus output by the core may include dummy or place-holder FEC information. High-speed serial interface ("HSSI") hard IP circuitry of the PLD is used to calculate meaningful or true FEC information for each block received from the PLD core circuitry and to include that meaningful or true FEC information in each block (e.g., by using the meaningful information to replace initially received dummy information). The HSSI hard IP circuitry outputs the final blocks as a serial data output signal.

On the receiver side, HSSI hard IP circuitry is used to recover user data and FEC information from a received serial data signal. Additional hard IP circuitry is used for FEC detection and correction, but data buffering (if needed) between the data recovery and FEC circuitry is preferably provided in more general-purpose, programmable, core circuitry of the PLD. After FEC detection and correction, the data may be further processed in still more hard IP circuitry, preferably still at the FEC block data rate. After such possible further processing, the data is transferred to the PLD core circuitry, which preferably provides any needed buffering of the data between the FEC block data rate and a data rate that is appropriate for the user data alone (i.e., without the FEC overhead information).

Further features of the invention, its nature and various advantages, will be more apparent from the accompanying drawings and the following detailed description.

DETAILED DESCRIPTION

Figure 1:
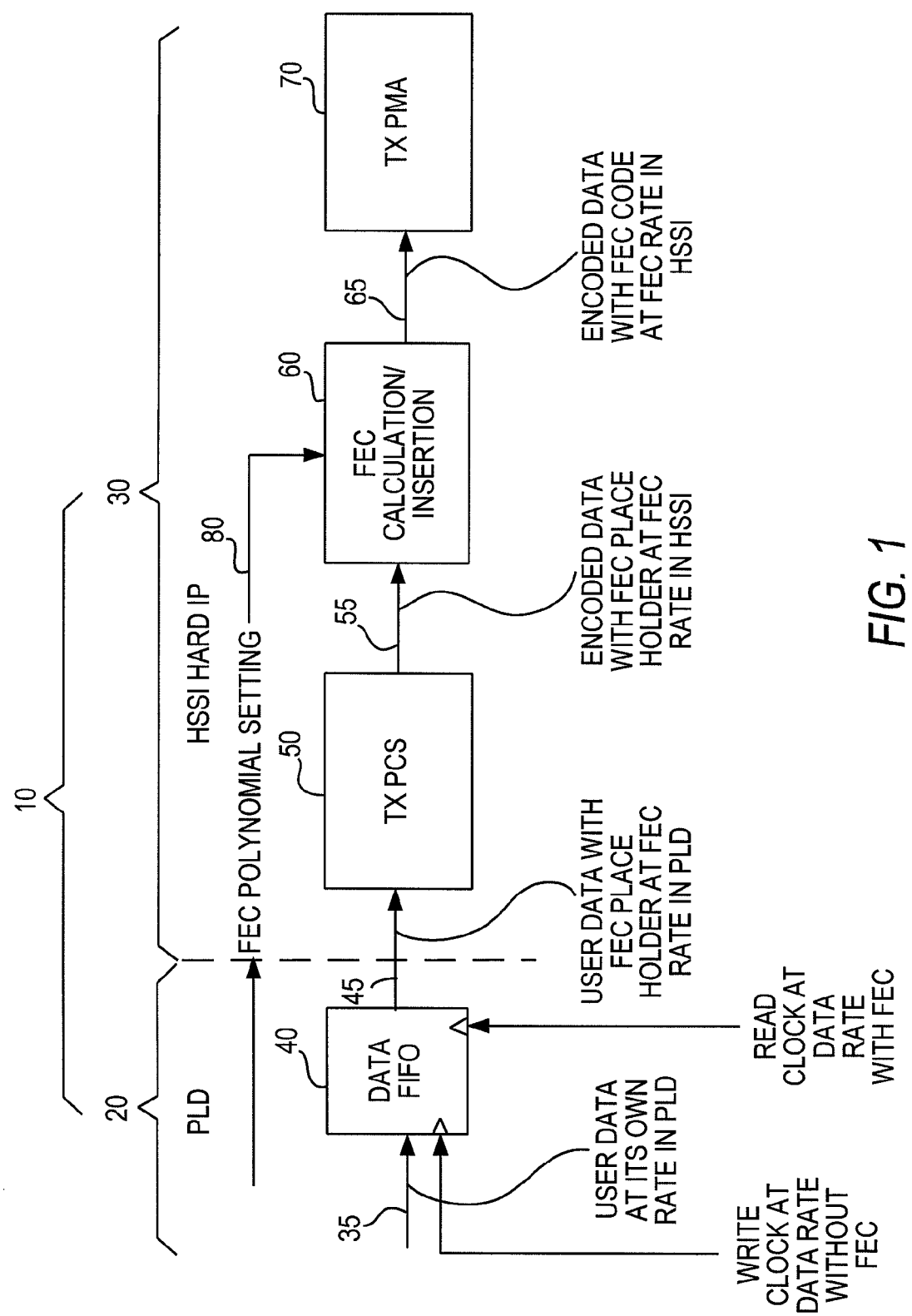
FIG. 1 is a simplified block diagram of a portion of an illustrative embodiment of a PLD in accordance with certain aspects of the invention.

The portion of illustrative PLD 10 that is shown in FIG. 1 includes a portion of PLD core 20 and so-called HSSI hard IP (high-speed serial interface hard intellectual property). PLD core 20 is the typical general-purpose, and therefore highly programmable, core logic of the PLD. Although general-purpose in overall character, PLD core 20 may include some portions that are somewhat dedicated to particular types of functions. For example, PLD core 20 typically includes some blocks of memory circuitry. One or more of such memory blocks may be used to provide data FIFO (first-in/first-out memory) 40. Data FIFO 40 is typically programmable or configurable with respect to such attributes as the width of its data input bus, the width of its data output bus, the number of data blocks it can store, etc. Data FIFO 40 also has the ability to do separate writes and reads timed by respective, separate, write and read clock signals. (The term data block or block (in the context of data) is used to refer to any plural number of bits. For example, a data block may include multiple bits of user data and, after FEC processing, multiple bits of FEC information.)

HSSI hard IP 30 is shown in FIG. 1 as including TX PCS (transmitter physical coding sublayer) circuitry 50, FEC calculation/insertion circuitry 60, and TX PMA (transmitter physical media access) circuitry 70. HSSI hard IP 30 is fundamentally different from PLD core 20 in that circuitry 30 is made up, for the most part, of blocks of circuitry that are dedicated to performing particular functional tasks. In other words, the blocks are hard-wired or at least partly hard-wired (hence the term hard IP). They are not more broadly general-purpose circuitry like PLD core 20. Various circuit blocks in HSSI hard IP 30 may be statically or dynamically controllable to select or modify their functions in some respects. But the fundamental function(s) of the various circuit blocks in the hard IP are basically fixed or predetermined. An example of a function that may be performed by a hard IP circuit block in TX PCS 50 is 8-bit-to-10-bit encoding (e.g., as in Franaszek et al. U.S. Pat. No. 4,486,739). Examples of functions that may be performed by a hard IP circuit block in TX PMA

70 are (1) conversion of parallel data to serial form, and (2) driving the serial data out of PLD 10 as a differential signal pair.

In accordance with the present invention, FEC calculation/insertion circuitry 60 is another hard IP block that is added to HSSI hard IP 30. Although block 60 will be further described below, preliminarily it is noted that this block is dedicated to calculating the FEC information for each user data block and including that FEC information with the user data in a final block that is to be transmitted from PLD 10. FEC block 60 may receive the FEC polynomial that it is to use in its calculation of FEC information from PLD core 20 or from any other suitable source via leads 80.

In accordance with this invention, the user functions in PLD core 20 assemble the FEC blocks with the actual user data for each block but with only dummy or place-holder information in bit positions that are reserved for FEC information. For example, this initial dummy or place-holder information can be all zeros or a particular code. This implementation avoids a TX FIFO in hard IP 30 to buffer data while the FEC code is inserted and the data rate is converted (from the typically slower data rate that can be used for data without associated FEC information to the typically higher data rate that is needed after FEC information has been associated with the user data). This implementation also simplifies the TX PCS clocking with only one clock rate. The TX FIFO (element 40 in FIG. 1) can be implemented utilizing the block memory resources in PLD fabric 20, where the memory density is high. The FIFO 40 write clock shown in FIG. 1 is at or based on the slower data rate referred to earlier in this paragraph. The FIFO 40 read clock shown in FIG. 1 is at or based on the faster (higher) data rate referred to earlier in this paragraph.

As shown in FIG. 1, the user data 35 is fed, at its own rate (the write clock rate), into PLD memory block 40 (TX FIFO). At the output 45 of block 40, the data rate is changed to the data rate with FEC (the read clock rate). Because FEC imposes an overhead on the user data, the output typically runs faster than the input, typically by about 3-7%. In the place of real FEC codes, the bit positions reserved for FEC information can be left at all zeros or a particular code on bus 45 (referred to earlier as dummy or place-holder FEC information). The read clock signal can come from or be shared with HSSI hard IP 30 because it can also be a basis for the rate at which at least some operations are performed in HSSI hard IP 30.

The bus 45 data is processed by TX PCS 50 and the real FEC information is calculated by FEC insertion block 60. The calculated FEC value is, of course, based on the user data in each block. It can be XORed (Exclusive OR combination) with the initial (dummy) value placed in the FEC position. The input bus 55 and output bus 65 width of FEC encoder 60 can be 32 bits. At 90 nm (90 nanometer integrated circuit fabrication design rule), circuitry 60 can easily operate at 400 MHz (megahertz) to 500 MHz, which allows a throughput of 12.8 Gbps or higher. Configuration bits 80 from PLD 20 can control the FEC polynomial.

Figure 2:
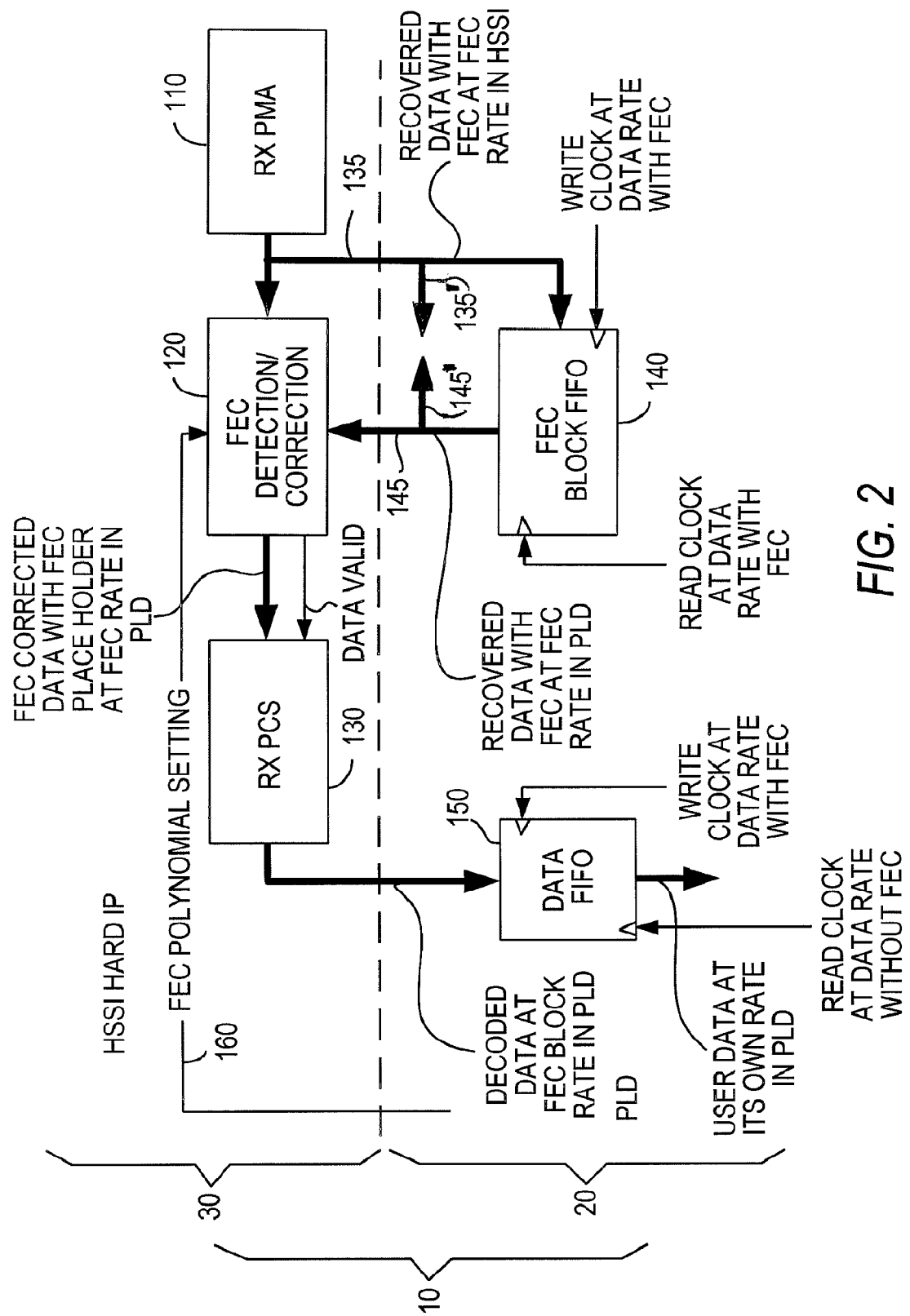
FIG. 2 is a simplified block diagram of a portion of an illustrative embodiment of a PLD in accordance with certain other aspects of the invention.

FIG. 2 is similar in character to FIG. 1, except that FIG. 2 shows illustrative receiver circuitry in accordance with the invention. PLD 10 in FIG. 2 can be the same PLD as in FIG. 1, or it can be a different PLD. PLD core 20 in FIG. 2 can be the same as PLD core 20 in FIG. 1 (i.e., general-purpose, programmable logic). HSSI hard IP circuitry 30 in FIG. 2 can be the same general type of circuitry as HSSI hard IP circuitry 30 in FIG. 1 (i.e., circuitry that is hard-wired to at least some extent to perform at least some functional aspects of its operations).

As shown in FIG. 2, PLD core circuitry 20 is programmed or configured to provide two FIFO memory elements, i.e., FEC block FIFO 140 and data FIFO 150. HSSI hard IP 30 in FIG. 2 includes receiver physical media access ("RX PMA") circuitry 110, FEC detection/correction circuitry 120, and receiver physical coding sublayer ("RX PCS") circuitry 130.

RX PMA circuitry 110 receives a serial data signal (typically from a source external to PLD 10) and converts the information in that signal to parallel form. For example, RX PMA circuitry 110 may include clock and data recovery ("CDR") circuitry for recovering clock and data signals from the received serial data. Circuitry 110 may further include serial-to-parallel converter circuitry for converting the recovered serial data to parallel form.

RX PMA must, of course, operate at the data-with-FEC clock rate because it is receiving user data with the extra-bits overhead of FEC information. At the high data rates that are particularly of interest in connection with this invention, it may be necessary to store one or two FEC blocks (i.e., a block of received user data with its received FEC information) while bit errors and their locations are identified. Because device 10 is preferably a general-purpose device that can support any of a wide range of different applications, FEC block size may vary from one application to another. As a result, the FIFO size required to store one or two FEC blocks may vary for different applications. It is therefore better to utilize the built-in, high-density memory blocks in PLD core 20 for this FIFO task than to attempt to provide dedicated FIFO in HSSI hard IP 30. FEC block FIFO 140 is accordingly provided in PLD core 20, and hard IP interfaces 135 and 145 are provided to and from that FIFO. Again, it is noted that the memory blocks in PLD core 20 are typically programmable or configurable with respect to such aspects as input bus width, output bus width, and depth. Because FIFO 140 is serving the needs of HSSI hard IP 30 on both the write and read sides, FIFO 140 may share with or get from hard IP 30 its write and read clock signals. Both of these clocks are preferably based on the FEC block data rate at which hard IP 30 is receiving and processing received user data with associated received FEC information. As in FIG. 1, this is typically a faster data rate than may be used in PLD core 20 for the user data alone (i.e., after removal of the FEC information).

As shown in FIG. 2, the recovered data and clock from RX PMA 110 are sent to both FEC detection/correction circuitry 120 in HSSI hard IP 30 and to FEC block FIFO 140 in PLD core circuitry 20. Circuitry 120 performs the FEC calculation to determine what, if any, bit errors the user data in a block contains and where in the user data those errors are. FIFO 140 stores the block or blocks for which the FEC calculation is underway. Upon completion of the FEC calculation, the buffered data in FIFO 140 is read back into circuitry 120 and corrected (if necessary). Each block is then sent to RX PCS circuitry 130. FEC block 120 may receive the FEC polynomial that it is to use in its FEC calculations from PLD core 20 or from any other suitable source via leads 160. Examples of functions that may be performed by RX PCS circuitry 130 are (1) word alignment and (2) 10-bit-to-8-bit decoding (again as in the above-mentioned Franaszek et al. patent).

In preferred embodiments of the invention, the data rate is kept the same throughout HSSI hard IP circuit elements 110, 120, and 130. This helps to simplify HSSI hard IP 30 (e.g., by avoiding a change of data rates in the hard IP and thereby also avoiding a need for a FIFO in the hard IP to buffer data between different data rates). Circuitry 120 therefore preferably forwards data to RX PCS 130 with that data's FEC information or some other dummy or place-holder information taking the place of the original, received FEC information. To ensure that RX PCS 130 operates only on the real user data and not on the FEC or FEC-type information, circuitry 120 asserts a data valid output signal when it is outputting user data. Circuitry 120 de-asserts the data valid output signal when it is outputting FEC or FEC-type information. RX PCS 130 performs its operations on data received while the data valid signal is asserted. RX PCS 130 does not process during FEC data cycles when the data valid signal is de-asserted. Again, this avoids the need for a FIFO to convert the data rate between FEC block 120 and RX PCS block 130.

RX PCS circuitry 130 outputs data at the FEC block rate, which data is applied to data FIFO circuitry 150 in PLD core 20. FIFO circuitry 150 subsequently outputs this data at a rate that is appropriate for user data without the overhead of extra FEC information. Accordingly, buffering between the FEC block rate used in HSSI hard IP 30 and the (typically slower) data rate without FEC that can be used in PLD core 20 is provided by FIFO 150, which can again be provided by built-in high-density memory blocks in the PLD core. As has been said, such memory blocks are typically designed to be programmable with respect to such features as input bus width, output bus width, and memory depth, and also to support separate and possibly different write and read clocks. In the case of FIFO 150, the typically faster write clock can come from or be shared with HSSI hard IP 30. The typically slower read clock can come from the circuitry of PLD core 20.

In accordance with another possible mode of operation, PLD core 20 in FIG. 2 is programmed to independently implement forward error correction. The data on leads 135 or leads 145 can be applied (via branch leads 135' or 145') to the PLD core 20 circuitry that is implementing FEC. In this way, elements 120 and 130 (which are not used in this alternate operating mode) can be bypassed.

From the foregoing it will be seen that this invention offers an efficient high-speed (e.g., 10 Gbps) FEC feature for high-speed serial applications. It is not subject to possible speed limitation of the general-purpose logic elements in PLD core 20. Nor is it subject to possible resource limitations that might be encountered by trying to perform all FEC operations in PLD core 20. It can run faster than 12 Gbps with 90 nm technology. It offers an FEC solution for communication links running at 10 Gbps or faster, or for applications demanding ultra-low bit-error rates.

The invention effectively boosts signal-to-noise ratio, and may make it possible to lower power consumption. For the same power budget, an FEC feature can allow the link length to be increased. For the same bit-error-rate, an FEC can save power and may also simplify the analog module (70 and/or 110) settings to tolerate some errors in data recovery.

Whenever an FEC code is inserted or removed, the data rate is changed. This invention minimizes the clock domain transfers in both TX and RX. The invention therefore optimizes the clocking scheme in hard IP 30. Whenever an FEC code is inserted or removed, a data FIFO must be used to buffer the data. This invention leaves TX FIFO 40 in PLD core 20 and optimizes the TX-hard-IP/PLD-core interface to only one such interface.

In RX, FEC must be done right after data recovery. This invention utilizes high-density memory block resources in PLD core 20 for RX FIFO 140, thereby avoiding having to build a large RX data FIFO in RX hard IP 30. The RX PCS functions 130 are still useful along with FEC (because FEC 120 is provided and done in hard IP 30 upstream from RX PCS). If FEC were done in PLD core 20, RX PCS 130 would have to be bypassed, and any necessary operations like those available in RX PCS 130 would have to be performed in PLD core 20. RX PCS 130 would therefore be effectively wasted.

This invention allows addition of an FEC feature to PLD serial interface channels running 10 Gbps or faster. Many data communication and telecom applications require FEC features at high speed. The invention can also be helpful for applications that do not require high speeds (e.g., 10 Gbps or higher) but that do require very low bit-error rates and/or high signal-to-noise ratio. The invention provides a different way to lower overall power consumption or to span link distances that were not previously attainable. The solution is die-size optimized. The predominantly standard functions are done in hard IP 30, and the custom-sizing of FIFO is done with built-in memory blocks in PLD core 20. The invention extends an FPGA's advantages in being able to offer design flexibility to users.

It will be understood that the foregoing is only illustrative of the principles of the invention, and that various modifications can be made by those skilled in the art without departing from the scope and spirit of the invention. For example, the particular data rates mentioned herein are only illustrative, and the invention can be used with other slower or faster data rates if desired. The term data rate is frequently used herein, but it will be understood that terms like clock, clock rate, clock frequency, or the like could have been used instead. There is typically a well-understood relationship between data rates and associated clock signal rates or frequencies. Terms like data rate, clock rate, etc., may be used to refer to a family of such rates that are generally relatively simple integer multiples of one another. For example, the same data in serial (bit) and parallel (word) form with no buffering (or no significant buffering) between them may be said to have the same data rate, although it will be understood that the serial bits come at N times the rate of the associated parallel words (where N is the number of bits in a word). The generic concept of a data rate is sufficient for present purposes, without distinguishing between whether data is in serial or parallel form.

The invention claimed is:

1. An integrated circuit comprising:
   programmable logic device ("PLD") core circuitry that implements a first-in/first-out ("FIFO") memory for inputting blocks of user data at a first clock rate that is appropriate for user data without forward error correction ("FEC") information, and for outputting blocks of user data at a second clock rate that is appropriate for user data with FEC information, the FIFO memory being programmable with respect to the number of blocks of data it can store; and
   dedicated, high-speed, hard intellectual property ("IP") circuitry that includes FEC calculation and insertion circuitry for calculating FEC information for each block of user data output by the FIFO memory circuitry at the second clock rate, associating that FEC information with the user data, and outputting the user data and the associated FEC information at the second clock rate.

2. The integrated circuit defined in claim 1 wherein the FIFO memory is implemented using at least one block of memory in the programmable circuitry.

3. The integrated circuit defined in claim 1 wherein the programmable circuitry outputs blocks of user data that additionally include dummy FEC information, and wherein the FEC calculation and insertion circuitry includes circuitry for replacing the dummy FEC information with the FEC information.

4. The integrated circuit defined in claim 3 wherein the circuitry for replacing performs an Exclusive OR operation on the dummy FEC information and the FEC information to replace the dummy FEC information with the FEC information.

5. The integrated circuit defined in claim 1 further comprising:
circuitry for supplying an FEC polynomial to the FEC calculation and insertion circuitry.

6. The integrated circuit defined in claim 5 wherein the circuitry for supplying comprises:
configuration circuitry of the programmable circuitry.

7. A method of operating an integrated circuit that includes programmable circuitry and dedicated high-speed circuitry comprising:
using the programmable circuitry to assemble blocks of user data and to supply the blocks of user data and dummy forward error correction ("FEC") information to the dedicated high-speed circuitry; and
using the dedicated high-speed circuitry to calculate FEC information for each of the blocks of user data and to replace the dummy FEC information with the FEC information.

8. The method defined in claim 7 wherein the programmable circuitry assembles the blocks of user data using a first clock rate that is appropriate for blocks of user data without FEC information.

9. The method defined in claim 8 wherein the programmable circuitry supplies the blocks of user data to the dedicated high-speed circuitry using a second clock rate that is appropriate for the blocks of user data with FEC information.

10. The method defined in claim 9 wherein the second clock rate is higher than the first clock rate.

11. The method defined in claim 7 wherein the using the dedicated high-speed circuitry includes XORing the dummy FEC information and the FEC information to replace the dummy FEC information with the FEC information.

12. An integrated circuit comprising:
dedicated, high-speed, hard intellectual property ("IP") circuitry including input circuitry for receiving a serial data signal that includes successive blocks of user data and forward error correction ("FEC") code information, and FEC detection and correction circuitry for using the FEC code information to detect and correct errors in the user data; and
programmable logic device ("PLD") core circuitry that is outside the dedicated high-speed circuitry and that implements a first-in/first-out ("FIFO") memory for accepting data output by the input circuitry and for applying that data to the FEC detection and correction circuitry, the FIFO memory being programmable with respect to the number of blocks of data it can store.

13. The integrated circuit defined in claim 12 wherein the dedicated high-speed circuitry further includes:
physical coding sublayer circuitry for processing data output by the FEC detection and correction circuitry.

14. The integrated circuit defined in claim 13 wherein the programmable circuitry further implements a second FIFO memory for accepting data output by the physical coding sublayer circuitry and for outputting that data to other circuitry of the programmable circuitry.

15. The integrated circuit defined in claim 14 wherein the serial data signal has a first data rate and wherein the FEC detection and correction circuitry and the physical coding sublayer circuitry operate at the first data rate.

16. The integrated circuit defined in claim 13 wherein the second FIFO accepts data at the first data rate and outputs data at a second data rate.

17. The integrated circuit defined in claim 16 wherein the second data rate is appropriate for user data without FEC information.

18. The integrated circuit defined in claim 15 wherein the physical coding sublayer circuitry is enabled to operate when the FEC detection and correction circuitry is outputting user data, but not when the FEC detection and correction circuitry is not outputting user data.

19. A method of operating an integrated circuit that includes dedicated, high-speed, hard intellectual property ("IP") circuitry and programmable logic device ("PLD") core circuitry that is outside the dedicated high-speed circuitry comprising:
using input circuitry in the dedicated high-speed circuitry to receive a serial data signal that includes successive blocks of user data and forward error correction ("FEC") code information;
using FEC detection and correction circuitry in the dedicated high-speed circuitry to detect and correct errors in the user data based on the FEC code information; and
using the programmable circuitry to buffer data between the input circuitry and the FEC detection and correction circuitry, wherein the programmable circuitry is programmable with respect to the number of blocks of data that it can store between the input circuitry and the FEC detection and correction circuitry.

20. The method defined in claim 19 further comprising:
using physical coding sublayer circuitry in the dedicated high-speed circuitry to process data output by the FEC detection and correction circuitry.

21. The method defined in claim 20 further comprising:
using the programmable circuitry to buffer data output by the physical coding sublayer circuitry.

22. The method defined in claim 21 wherein the serial data signal has a first data rate, and wherein the FEC detection and correction circuitry and the physical coding sublayer circuitry operate at the first data rate.

23. The method defined in claim 22 wherein the programmable circuitry is used to buffer the data output by the physical coding sublayer circuitry between the first data rate and a second data rate.

24. The method defined in claim 23 wherein the second data rate is appropriate for processing the user data without the FEC information.

25. The method defined in claim 20 further comprising:
enabling the physical coding sublayer circuitry when the FEC correction and detection circuitry is outputting user data, and disabling the physical coding sublayer circuitry when the FEC correction and detection circuitry is not outputting user data.

26. A method of operating an integrated circuit with dedicated, hard intellectual property ("IP") circuitry and programmable logic devide ("PLD") core circuitry comprising:
receiving a serial data signal with the dedicated circuitry, the serial data signal including successive blocks of user data and error correction code information;
buffering the user data with the programmable circuitry; and then
using the dedicated circuitry again to detect and correct errors in the user data by reference to the error correction code information, wherein the programmable circuitry is programmable with respect to the number of blocks of data that it can store between the receiving and the using.

27. An integrated circuit comprising dedicated receiver circuitry with physical coding sublayer ("PCS") functionality and a programmable core, wherein when the programmable core is programmed to independently implement forward error correction, the PCS functionality in the dedicated receiver circuitry is bypassed and wherein when the programmable core is programmed to split implementation of the forward error correction with the dedicated receiver circuitry, the PCS functionality is not bypassed.

28. The integrated circuit of claim 27 wherein when the programmable core is programmed to split implementation of the forward error correction with the dedicated receiver circuitry, the programmable core implements first-in/first-out memory for use in the implementation of the forward error correction.

* * * * *